US012732524B2

(12) United States Patent
Xu et al.

(10) Patent No.: US 12,732,524 B2
(45) Date of Patent: Sep. 8, 2026

(54) METHOD FOR PRE-DETECTING RISKY CODE, COMPUTER DEVICE, AND COMPUTER READABLE STORAGE MEDIUM

(71) Applicants: CHINA MOBILE GROUP DESIGN INSTITUTE CO., LTD., Beijing (CN); CHINA MOBILE COMMUNICATIONS GROUP CO., LTD., Beijing (CN)

(72) Inventors: Weipeng Xu, Beijing (CN); Xia Ouyang, Beijing (CN); Wei Li, Beijing (CN); Haotian Zhao, Beijing (CN)

(73) Assignees: China Mobile Group Design Institute Co., LTD., Beijing (CN); China Mobile Communications Group Co., LTD., Beijing (CN)

( * ) Notice: Subject to any disclaimer, the term of this patent is extended or adjusted under 35 U.S.C. 154(b) by 26 days.

(21) Appl. No.: 18/696,412

(22) PCT Filed: Jan. 11, 2023

(86) PCT No.: PCT/CN2023/071818
§ 371 (c)(1),
(2) Date: Mar. 28, 2024

(87) PCT Pub. No.: WO2023/236538
PCT Pub. Date: Dec. 14, 2023

(65) Prior Publication Data

US 2024/0396926 A1 Nov. 28, 2024

(30) Foreign Application Priority Data

Jun. 6, 2022 (CN) ......................... 202210631419.1

(51) Int. Cl.
*H04L 9/40* (2022.01)
*G06F 21/57* (2013.01)

(52) U.S. Cl.
CPC ........ *H04L 63/1433* (2013.01); *G06F 21/577* (2013.01); *H04L 63/08* (2013.01)

(58) Field of Classification Search
CPC .... H04L 63/1433; H04L 63/08; G06F 21/577
See application file for complete search history.

(56) References Cited

U.S. PATENT DOCUMENTS 9,558,348 B1 * 1/2017 Muttik .................. G06Q 50/00
2004/0153644 A1 * 8/2004 McCorkendale ....... G06F 21/56
726/24

(Continued)

FOREIGN PATENT DOCUMENTS

CN 105095091 A 11/2015
CN 108399337 A 8/2018

(Continued)

OTHER PUBLICATIONS

International Search Report for corresponding PCT/CN2023/071818, dated Apr. 27, 2023, with English translation (12 pages).

(Continued)

*Primary Examiner* — Jung W Kim
(74) *Attorney, Agent, or Firm* — Maginot, Moore & Beck, LLP

(57) ABSTRACT

A method for pre-detecting a risky code, which is performed by an apparatus for pre-detecting the risky code. The method includes: receiving a code to be detected input by a target user, and obtaining a target historical evaluation record of the target user, a target historical login time and a target historical login address for login to the apparatus for pre-detecting the risky code; analyzing the target historical evaluation record based on a first preset rule to obtain a (Continued)

target trustworthiness score, analyzing the target historical login time based on a second preset rule to obtain a time consistency score, analyzing the target historical login address based on a third preset rule to obtain a regional score, analyzing keyword information of the code to be detected based on a fourth preset rule to obtain a keyword score; and analyzing the target user trustworthiness score, the time consistency score, the regional score, and the keyword score to obtain a risk level of the code to be detected, and outputting the risk level.

15 Claims, 2 Drawing Sheets

(56) References Cited

U.S. PATENT DOCUMENTS

| | | | | |
|---|---|---|---|---|
| 2005/0188423 | A1* | 8/2005 | Motsinger | G06F 11/3438<br>714/E11.195 |
| 2005/0283834 | A1* | 12/2005 | Hall | G06F 21/577<br>713/188 |
| 2013/0124644 | A1* | 5/2013 | Hunt | G06Q 50/01<br>709/206 |
| 2023/0050771 | A1* | 2/2023 | Chen | H04L 63/1425 |

FOREIGN PATENT DOCUMENTS

| | | | |
|---|---|---|---|
| CN | 110445790 | A | 11/2019 |
| CN | 110826071 | A | 2/2020 |
| CN | 110868383 | A | 3/2020 |
| CN | 111681004 | A | 9/2020 |
| CN | 112214402 | A | 1/2021 |
| WO | 2022114689 | A1 | 6/2022 |

OTHER PUBLICATIONS

Office Action for corresponding CN application No. 2022106314191, dated Apr. 23, 2026 (Chinese and English language document) (16 pages).

* cited by examiner

101 receiving a code to be detected input by a target user, and obtaining a target historical evaluation record of the target user, a target historical login time and a target historical login address for login to the apparatus for pre-detecting the risky code

102 analyzing the target historical evaluation record based on a first preset rule to obtain a target trustworthiness score, analyzing the target historical login time based on a second preset rule to obtain a time consistency score, analyzing the target historical login address based on a third preset rule to obtain a regional score, analyzing keyword information of the code to be detected based on a fourth preset rule to obtain a keyword score

103 analyzing the target trustworthiness score, the time consistency score, the regional score, and the keyword score to obtain a risk level of the code to be detected, and outputting the risk level

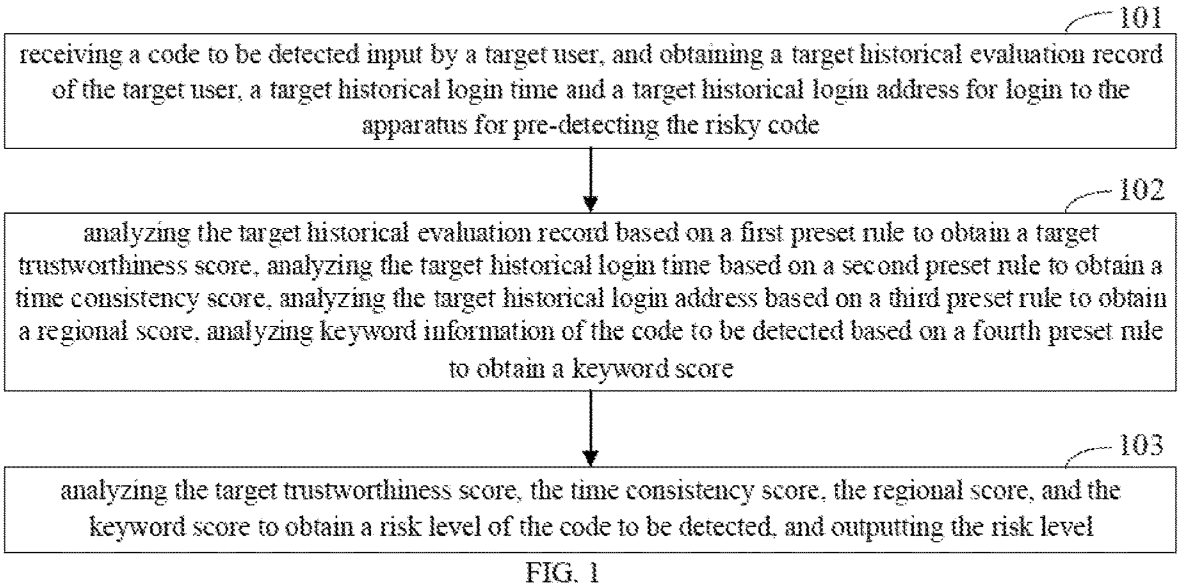

FIG. 1

F risk range security range

35

30

25

20

15

10

5 k

Fav

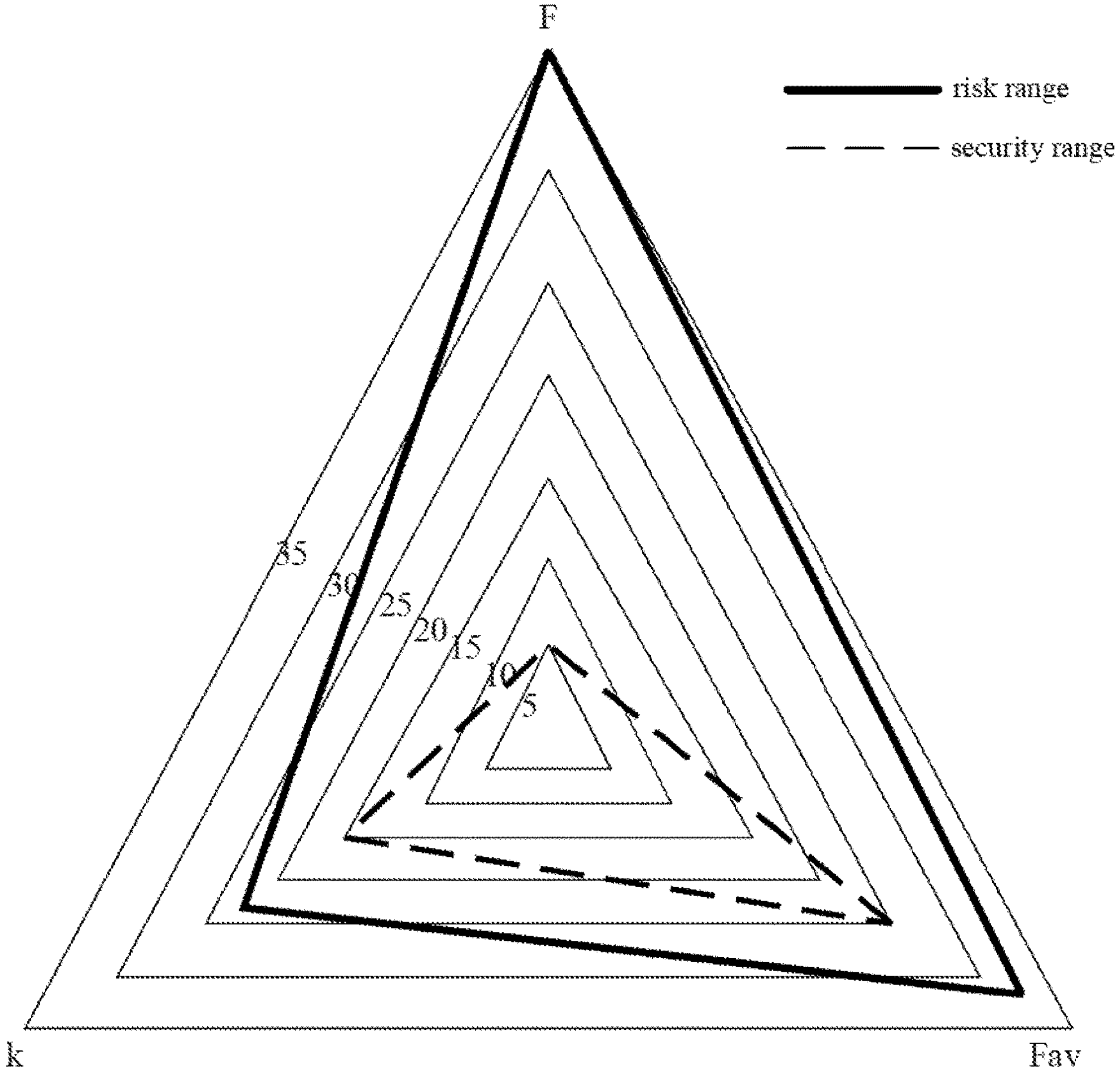

FIG. 2

METHOD FOR PRE-DETECTING RISKY CODE, COMPUTER DEVICE, AND COMPUTER READABLE STORAGE MEDIUM

CROSS-REFERENCE TO RELATED APPLICATIONS

This application is based on and claims priority to Chinese patent application NO. 202210631419.1, filed on Jun. 6, 2022, named as "risky code pre-detection method, apparatus and device, and storage medium", the entire contents of which are incorporated herein by reference.

TECHNICAL FIELD

Embodiments of the present disclosure relate to, but are not limited to, a field of risk identification technology, and in particular to a method and an apparatus for pre-detecting a risky code, a device, and a storage medium and a computer program product.

BACKGROUND

With a development of science and technology and a progress of society, a rapid development of the network technology brings a deep and significant change to the political, economic, cultural, educational, science and technology fields of society and the like, and also changes the lifestyle of people, so that online shopping, remote diagnosis, free mailbox and the like is rising quietly. By detecting the risky code in advance, a security of code management and control can be effectively improved.

SUMMARY

Embodiments of the present disclosure provide a method and an apparatus for pre-detecting a risky code, a device, and a storage medium and a computer program product.

According to an aspect of the embodiments of the present disclosure, a method for pre-detecting a risky code is provided, the method is applied to an apparatus for pre-detecting the risky code, and includes: after receiving a code to be detected input by a target user, obtaining a target historical evaluation record of the target user, a target historical login time and a target historical login address for login to the apparatus for pre-detecting the risky code; analyzing the target historical evaluation record based on a first preset rule to obtain a target trustworthiness score, analyzing the target historical login time based on a second preset rule to obtain a time consistency score, analyzing the target historical login address based on a third preset rule to obtain a regional score, analyzing keyword information of the code to be detected based on a fourth preset rule to obtain a keyword score; and analyzing the user trustworthiness score, the time consistency score, the regional score, and the keyword score to obtain a risk level of the code to be detected, and outputting the risk level.

According to another aspect of the embodiments of the present disclosure, an apparatus for pre-detecting a risky code is provided, and includes: an obtaining portion, configured to obtain a target historical evaluation record of a target user, a target historical login time and a target historical login address for login to the apparatus for pre-detecting the risky code after receiving a code to be detected input by the target user; a score evaluating portion, configured to analyze the target historical evaluation record based on a first preset rule to obtain a target trustworthiness score, analyze the target historical login time based on a second preset rule to obtain a time consistency score, analyze the target historical login address based on a third preset rule to obtain a regional score, and analyze keyword information of the code to be detected based on a fourth preset rule to obtain a keyword score; and a risk analyzing portion, configured to analyze the user trustworthiness score, the time consistency score, the regional score, and the keyword score to obtain a risk level of the code to be detected, and output the risk level.

According to another aspect of the embodiments of the present disclosure, a computer device is provided, the computer device includes: a processor, a memory, a communication interface, and a communication bus, in which, the processor, the memory, and the communication interface complete mutual communications through the communication bus; the memory is configured to store at least one executable instruction, and the at least one executable instruction causes the processor to execute operations of the method for pre-detecting a risky code described above.

According to another aspect of the embodiments of the present disclosure, a computer readable storage medium is provided, which may be a volatile storage medium or a non-volatile storage medium. At least one executable instruction is stored in the computer readable storage medium, when the at least one executable instruction runs on a computer device/apparatus, the computer device/apparatus is caused to execute operations of the method for pre-detecting a risky code described above.

With the method for pre-detecting the risky code in the embodiments of the present disclosure, before the code to be detected is executed, the target historical evaluation record of the target user uploading the code to be detected, the target historical login time and the target historical login address for the target user to login to the apparatus for pre-detecting the risky code are obtained. Then the target historical evaluation record, the target historical login time and the target historical login address are analyzed, so that the analysis is performed on the target user from three perspectives of user trustworthiness, time security, and regional security to obtain the user trustworthiness score, the time consistency score and the regional score. The keyword of the code to be detected is analyzed to obtain the keyword score of the code to be detected. The risk level of the code to be detected is determined by using the user trustworthiness score, the time consistency score, the regional score and the keyword score. On one hand, in combination with the detection and recognition of the target user and the detection and recognition of the code to be detected, the historical evaluation record of the target user is taken as a reference, so as to enhance an accuracy of the risk identification of the code to be detected. On the other hand, the risk identification and detection is performed before the code to be detected is executed rather than after a risk occurs, so that the possible risk is avoided in advance and an occurrence of major losses is reduced.

The foregoing description is merely an overview of technical solutions of the embodiments of the present disclosure, and in order to more clearly understand technical means of the embodiments of the present disclosure, implementation can be performed according to the content of the description, and in order to make the above and other objects, features and advantages of the embodiments of the present disclosure more comprehensible, specific embodiments of the present disclosure are specifically described below.

It should be understood that the above general descriptions and following detailed descriptions are only illustrative and descriptive, and not intended to limit the present disclosure.

BRIEF DESCRIPTION OF THE DRAWINGS

The accompanying drawings herein are incorporated into the specification and constitute a part of the specification, embodiments in conformity with the present disclosure are shown in the drawings, and the technical solution of the present disclosure is explained together with the specification.

The drawings are only used for illustrative purposes and are not considered as limitations of the present disclosure. Moreover, throughout the entire drawings, same reference numerals are used to represent same components, in which:

FIG. 1 is a flowchart of a method for pre-detecting a risky code according to an embodiment of the present disclosure.

FIG. 2 is a diagram of a risk range triangle according to an embodiment of the present disclosure.

DETAILED DESCRIPTION

Figure 3:
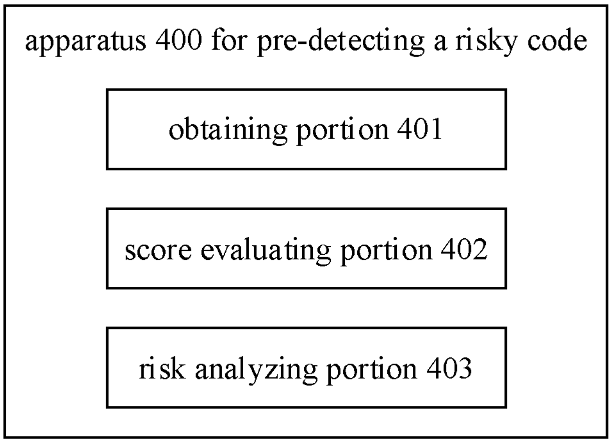
FIG. 3 is a block diagram of an apparatus for pre-detecting a risky code according to an embodiment of the present disclosure.

Example embodiments of the present disclosure will be described in more detail below with reference to the accompanying drawings. Although example embodiments of the present disclosure are shown in the drawings, it should be understood that the present disclosure may be implemented in various forms and should not be limited by the embodiments set forth herein.

FIG. 1 shows a flowchart of a method for pre-detecting a risky code according to an embodiment of the present disclosure, and the method is executed by a computer device. As shown in FIG. 1, the method includes the following steps.

At step 101, after receiving a code to be detected input by a target user, a target historical evaluation record of the target user, a target historical login time and a target historical login address for login to an apparatus for pre-detecting the risky code are obtained.

It should be noted that the method for pre-detecting the risky code of the embodiment is applied to the apparatus for pre-detecting the risky code, and the method for pre-detecting the risky code detects and identifies a risk level of a code before the code is executed.

In some embodiments, after receiving the code to be detected uploaded by the target user, the target historical evaluation record of the target user is obtained. The target historical evaluation record refers to an evaluation record generated after evaluating the code that has been uploaded by the target user in the past. The target historical login time refers to a time distribution of the target user logging in to the apparatus for pre-detecting the risky code within a preset time period in the past. The target historical login address refers to an IP address of the target user logging in to the apparatus for pre-detecting the risky code within a preset time period in the past.

At step 102, the target historical evaluation record is analyzed based on a first preset rule to obtain a target trustworthiness score, the target historical login time is analyzed based on a second preset rule to obtain a time consistency score, the target historical login address is analyzed based on a third preset rule to obtain a regional score, and keyword information of the code to be detected is analyzed based on a fourth preset rule to obtain a keyword score.

In some embodiments, after obtaining the code to be detected, the target historical evaluation record, the target historical login time and the target historical login address, the code to be detected, the target historical evaluation record, the target historical login time and the target historical login address are analyzed by using preset rules to obtain a user trustworthiness score, the time consistency score and the regional score related to the target user, and the keyword score related to the code to be detected. On one hand, the code to be detected is directly analyzed to determine a possible risk in the code to be detected. On the other hand, a historical habit of a target is taken as portrayal information of the target user, and risky determination is performed in combination with the portrayal information, so as to enhance an accuracy of the risk detection and identification.

In some embodiments, at step 102, analyzing the historical evaluation record based on the first preset rule to obtain the target trustworthiness score includes steps 1.1 and 1.2.

At step 1.1, a preset number of latest user trustworthiness evaluation results are obtained from the target historical evaluation record, and a preset level corresponding to each of the user trustworthiness evaluation results is determined. A correspondence between each preset level and the first preset score is preset. The user trustworthiness evaluation result is generated according to the risk level of the code to be detected obtained by each evaluation.

In some embodiments, the user trustworthiness evaluation results of the preset number of code detection records recently submitted by the target user are obtained. For example, the user submits 10 code detection requests in the latest week, the user has 10 code detection records in the latest week and 10 corresponding user trustworthiness evaluation results, and the user trustworthiness evaluation results of the latest 3 code detection records are selected. It should be noted that the user trustworthiness corresponds to more than one preset level, which may be: high trustworthiness, trustworthiness, low trustworthiness and none. A trustworthiness of each level is provided with a corresponding first preset score, with reference to an example shown in Table 1.

TABLE 1

| trustworthiness level | high trustworthiness | trustworthiness | low trustworthiness | none |
|---|---|---|---|---|
| first preset score | 1 | 3 | 9 | 4 |

At step 1.2, the target trustworthiness score is calculated according to a target first preset score corresponding to each of the user trustworthiness evaluation results.

In some embodiments, a calculation formula of the target trustworthiness score is:

$$T = \left(\sum_{i=1} h(i)^2\right)/n;$$

where, T represents the target trustworthiness score, h(i) represents a first preset score corresponding to the trustworthiness level of an i-th level, and n represents a preset number.

The target trustworthiness score of the target user is used to perform a trust evaluation for the target user.

In some embodiments, at step 102, analyzing the target historical login record based on the second preset rule to obtain the time consistency score includes steps 2.1 to 2.3.

At step 2.1, a historical login time distribution of the target user within a preset number of days is obtained from the target historical login time.

In some embodiments, a time distribution for the target user to log into the apparatus for pre-detecting the risky code within a past time period (e.g., 30 natural days) is obtained.

At step 2.2, the historical login time distribution of each day is divided according to a preset time interval, and a daily time score is determined according to a division result.

In some embodiments, the preset time interval is defined in advance, for example, one day is divided into 5 preset time intervals, which are 0:00 to 6:00, 6:00 to 12:00, 12:00 to 18:00, 18:00 to 22:00, 22:00 to 24:00, etc. Moreover, a scoring rule of login time of the user is preset as follows, for example:

- when a login time of one day is distributed within three or less fixed continuous preset time intervals, 2 scores are counted;
- when the login time of one day is distributed within four fixed continuous preset time intervals, 3 scores are counted;
- when the login time of one day is distributed within three or less non-fixed continuous preset time intervals, the score is started from 4 scores and 0.1 score is added for addition of each case; when the login time of one day is distributed within four non-fixed continuous preset time intervals, the score is started from 5 scores and 0.1 score is added for addition of each case;
- when the login time of one day only does not cover one preset time interval, the score is started from 6 scores and 0.1 score is added for addition of each case;
- when the login time of one day is distributed within no preset time interval, 7 scores are counted, and the score is started from 6 scores and 0.1 score is added for each occurrence;
- when the login time of one day occupies all the preset time intervals, 10 scores are counted.

According to the scoring rule, the score corresponding to the historical login time of the target user in each day can be obtained.

At step 2.3, the time consistency score is calculated according to the daily time score.

In some embodiments, a calculation formula of the time consistency score is:

$$D = \left(\sum_{j=1} t(j)^2\right)/m;$$

where, D represents the time consistency score, t(j) represents a score corresponding to a j-th day, and m represents a preset number of days.

A function of the time consistency score is to determine whether the target user has a regular working time period.

In some embodiments, at step 102, analyzing the target historical login address based on the third preset rule to obtain the regional score includes steps 3.1 to 3.3.

At step 3.1, a preset number of latest login internet protocol (IP) address records of the target user are obtained from the target historical login address.

In some embodiments, when the target user logs into the apparatus for pre-detecting a risky code, an IP address of the target user is obtained and recorded.

At step 3.2, a first number of security domain logins in a preset security domain and a second number of non-security domain logins in a preset non-security domain are determined from the preset number of login IP address records. A correspondence between first numbers and second preset scores and a correspondence between second numbers and third preset scores are preset.

It should be noted that the preset security domain and the preset non-security domain are preset network environments. For example, the preset security domain may be a unit-recognizable internal network environment, and the preset non-security domain is a unit-recognizable external network environment. A unit may be an organization, department, division, etc. The correspondence between first numbers and second preset scores and the correspondence between second numbers and third preset scores are preset, with reference to Table 2.

TABLE 2

| first number of occurrences of security domain | second preset score | second number of occurrences of non-security domain | third preset score |
|---|---|---|---|
| 0 | 0 | 10 | 7 |
| 1 | 1 | 9 | 6.5 |
| 2 | 1 | 8 | 6 |
| 3 | 1 | 7 | 5.5 |
| 4 | 1 | 6 | 5 |
| 5 | 1 | 5 | 4.5 |
| 6 | 1 | 4 | 4 |
| 7 | 1 | 3 | 3.5 |
| 8 | 1 | 2 | 3 |
| 9 | 1 | 1 | 2 |
| 10 | 1 | 0 | 0 |

At step 3.3, the regional score is obtained according to a target second preset score corresponding to the first number and a target third preset score corresponding to the second number.

In some embodiments, a calculation formula of the regional score is:

$$A = \sum_{p=1} s(p) + o(q);$$

where, A represents the regional score, p refers to the first number of the security domain logins, q refers to the second number of the non-security domain logins, s(p) represents the second preset score corresponding to the first number of the security domain logins, and o(q) represents the third preset score corresponding to the second number of the non-security domain logins.

In some embodiments, at step 102, analyzing the keyword information of the code to be detected based on the fourth preset rule to obtain the keyword score includes steps 4.1 to 4.4.

At step 4.1, a keyword in the code to be detected is identified by using a preset keyword library.

In some embodiments, the keyword library is preset. The keyword in the code to be detected is obtained by matching the keyword library with the code to be detected.

At step 4.2, a target attribute label corresponding to the keyword is determined according to a function implemented by the keyword, and a target fifth preset score corresponding to the target attribute label is obtained. A correspondence between attribute labels and fifth preset scores is preset.

In some embodiments, the attribute label is set according to the function implemented by the keyword, for example, a "delete" label is marked for a keyword that implements a deletion function, and a "modify" label is marked for the keyword that implements a modification function. The attribute labels are provided with the fifth preset score in advance, with reference to Table 3.

TABLE 3

| attribute label | delete | modify | other |
|---|---|---|---|
| fifth preset score | 20 to 30 | 15 to 25 | 1 to 10 |

At step 4.3, a target influence range associated with the keyword is determined, and a target sixth preset score corresponding to the target influence range is obtained. A correspondence between influence ranges and sixth preset scores is preset.

In some embodiments, the influence range of the keyword refers to an influence on the whole code when the keyword is modified. A determination rule is preset, with reference to Table 4.

TABLE 4

| keyword | | | | | |
|---|---|---|---|---|---|
| influence range of "delete" and "modify" | value | influence range of "delete" and "modify" | value | influence range of "other" | value |
| 1 row/1 column | 1 | single file | 5 | increase data | 1 |
| less than 50 rows/ 50 columns | 3 | multiple files | 9 | less than 1 million | |
| single table | 5 | three or lower level directory | 6 | increase data less than 10 million | 2 |
| multiple tables | 9 | second level directory | 8 | increase data less than 10 million | 3 to 5 |
| library | 50 | first level directory | 9 | | |
| single file content | 1 | root directory | 50 | | |
| multiple file contents | 3 | | | | |

At step 4.4, the keyword score is obtained according to the target fifth preset score and the target sixth preset score.

In some embodiments, a calculation formula of the key score is:

$$B=\sum_{1}^{k}(c(k)^2+Ct(k)^2)/50000;$$

Where, B represents the key score, k represents a k-th row of code, c(k) represents the fifth preset score corresponding to the keyword in the k-th row of code, Ct(k) represents the sixth preset score corresponding to the keyword in the k-th row of code.

At step 103, the user trustworthiness score, the time consistency score, the regional score, and the keyword score are analyzed to obtain a risk level of the code to be detected, and the risk level is output.

In some embodiments, after the user trustworthiness score, the time consistency score, the regional score and the keyword score are obtained, the user trustworthiness score, the time consistency score, the regional score and the keyword score are analyzed, so that the risk level of the code to be detected is obtained.

In some embodiments, step 103 includes the following steps.

1. A first risk feature value is obtained according to the user trustworthiness score, the time consistency score, the regional score and the keyword score.

In some embodiments, the user trustworthiness score, the time consistency score, the region score, and the keyword score are accumulated according to a preset weight relationship to obtain the first risk feature value. The weight relationship is set as shown in Table 5.

TABLE 5

| user trustworthiness score | time consistency score | regional score | keyword score | other |
|---|---|---|---|---|
| 1.0 to 5.0 | 1.0 to 5.0 | 1.0 to 5.0 | 1% to 100% | 1% to 100% |

A calculation formula of the first risk feature value is:

$$F=\sum(T*g_1+D*g_2+A*g_3+B*g_4)/g_5;$$

where, F represents the first risk feature value, T represents the user trustworthiness score, $g_1$ represents a weight of the user trustworthiness score, D represents the time consistency score, $g_2$ represents a weight of the time consistency score, A represents the regional score, $g_3$ represents a weight of the regional score, B represents the keyword score, $g_4$ represents a weight of the keyword score, and $g_5$ represents another preset weight.

2. A number of code rows of the code to be detected is taken as a second risk feature value, and a third risk feature value is obtained according to the first risk feature value and the second risk feature value.

In some embodiments, the number of code rows of the code to be detected is used as the second risk feature value.

A calculation formula of the third risk feature value is:

$$Fav=F/k/3000;$$

where, Fav is the third risk feature value, F is the first risk feature value, and k is the second risk feature value.

3. The first risk feature value is compared with a first preset security range interval. The second risk feature value is compared with a second preset security range interval.

In some embodiments, referring to FIG. 2, a risk range triangle is constructed by using the first risk feature value, the second risk feature value, and the third risk feature value. As shown by solid lines in FIG. 2, the risk range triangle is compared with a preset security range triangle (as shown by dotted lines in FIG. 2), so as to determine the risk level of the code to be detected.

4. When the first risk feature value is within the first preset security range interval and the second risk feature value is within the second preset security range interval, the risk level of the code to be detected is determined as a security level and the security level is output.

5. When only the first risk feature value is not within the first preset security range interval or only the second risk feature value is not within the second preset security range interval, the risk level of the code to be detected is determined as a low risk level and the low risk level is output.

6. When the first risk feature value is not within the first preset security range interval and the second risk feature value is not within the second preset security range interval, the risk level of the code to be detected is determined as a high risk level and the high risk level is output.

In some embodiments, after step 103, the method further includes: when the risk level of the code to be detected is the high risk level, storing the code to be detected in a high risk code library and marking the code to be detected as non-modifiable.

In some embodiments, in order to facilitate the user to consult and analyze a detection result of the code, after the risk level of the code to be detected is obtained, if the risk level of the code to be detected is the high risk level, the code to be detected is stored in the high risk code library and the code to be detected is marked as non-modifiable. In some embodiments, the code to be detected with the high risk may also be marked as non-removable within a preset time period.

In the embodiments of the present disclosure, before the code to be detected is executed, the target historical evaluation record of the target user uploading the code to be detected, the target historical login time and the target historical login address for the target user to login to the apparatus for pre-detecting the risky code are obtained. Then the target historical evaluation record, the target historical login time and the target historical login address are analyzed, so that the analysis is performed on the target user from three perspectives of user trustworthiness, time security, and regional security to obtain the user trustworthiness score, the time consistency score and the regional score. The keyword of the code to be detected is analyzed to obtain the keyword score of the code to be detected. The risk level of the code to be detected is determined by using the user trustworthiness score, the time consistency score, the regional score and the keyword score. On one hand, in combination with the detection and recognition of the target user and the detection and recognition of the code to be detected, the historical evaluation record of the target user is taken as a reference, so as to enhance an accuracy of the risk identification of the code to be detected. On the other hand, the risk identification and detection is performed before the code to be detected is executed rather than after a risk occurs, so as to avoid possible risks in advance and reduce an occurrence of major losses.

FIG. 3 is a block diagram of an apparatus for pre-detecting a risky code of an embodiment of the present disclosure. As shown in FIG. 3, the apparatus 400 for pre-detecting the risky code includes an obtaining portion 401, a score evaluating portion 402, and a risk analyzing portion 403.

The obtaining portion 401 is configured to obtain a target historical evaluation record of a target user, a target historical login time and a target historical login address for login to an apparatus for pre-detecting the risky code, after receiving a code to be detected input by the target user.

The score evaluating portion 402 is configured to analyze the target historical evaluation record based on a first preset rule to obtain a target trustworthiness score, analyze the target historical login time based on a second preset rule to obtain a time consistency score, analyze the target historical login address based on a third preset rule to obtain a regional score, and analyze keyword information of the code to be detected based on a fourth preset rule to obtain a keyword score.

The risk analyzing portion 403 is configured to analyze the user trustworthiness score, the time consistency score, the regional score, and the keyword score to obtain a risk level of the code to be detected, and output the risk level.

In an optional manner, the score evaluating portion 402 executes the operation of analyzing the target historical evaluation record based on the first preset rule to obtain the target trustworthiness score by: obtaining a preset number of latest user trustworthiness evaluation results from the target historical evaluation record, and determining a preset level corresponding to each of the user trustworthiness evaluation results, in which a correspondence between each preset level and a first preset score is preset; and obtaining the target trustworthiness score according to a target first preset score corresponding to each of the user trustworthiness evaluation results.

In an optional manner, the score evaluating portion 402 executes an operation of analyzing the target historical login time based on the second preset rule to obtain the time consistency score by: obtaining a historical login time distribution of the target user within a preset number of days from the target historical login time; dividing the historical login time distribution of each day according to a preset time interval, and determining a daily time score according to a division result; and obtaining the time consistency score according to the daily time score.

In an optional manner, the score evaluating portion 402 executes an operation of analyzing the target historical login address based on the third preset rule to obtain the regional score by: obtaining a preset number of latest login internet protocol (IP) address records of the target user from the target historical login address; determining a first number of security domain logins in a preset security domain and a second number of non-security domain logins in a preset non-security domain from the preset number of login IP address records, in which a correspondence between first numbers and second preset scores and a correspondence between second numbers and third preset scores are preset; and obtaining the regional score according to a target second preset score corresponding to the first number of security domain logins and a target third preset score corresponding to the second number of non-security domain logins.

In an optional manner, the score evaluating portion 402 executes the operation of analyzing the keyword information of the code to be detected based on the fourth preset rule to obtain the keyword score by: identifying a keyword in the code to be detected by using a preset keyword library; determining a target attribute label corresponding to the keyword according to a function implemented by the keyword, and obtaining a target fifth preset score corresponding to the target attribute label, in which a correspondence between attribute labels and fifth preset scores is preset; determining a target influence range associated with the keyword, and obtaining a target sixth preset score corresponding to the target influence range, in which a correspondence between influence ranges and sixth preset scores is preset; and obtaining the keyword score according to the target fifth preset score and the target sixth preset score.

In an optional manner, the risk analyzing portion 403 executes an operation of analyzing the user trustworthiness score, the time consistency score, the regional score, and the keyword score to obtain the risk level of the code to be detected and outputting the risk level by: obtaining a first risk feature value according to the user trustworthiness score, the time consistency score, the regional score and the keyword score; taking a number of code rows of the code to be detected as the second risk feature value, and obtaining a third risk feature value according to the first risk feature value and the second risk feature value; comparing the first risk feature value with a first preset security range interval, and comparing the second risk feature value with a second preset security range interval; when the first risk feature value is within the first preset security range interval and the second risk feature value is within the second preset security range interval, determining the risk level of the code to be detected as a security level, and outputting the security level; when only the first risk feature value is not within the first preset security range interval or only the second risk feature value is not within the second preset security range interval, determining the risk level of the code to be detected as a low risk level, and outputting the low risk level; and when the first risk feature value is not within the first preset security range interval and the second risk feature value is not within the second preset security range interval, determining the risk level of the code to be detected as a high risk level, and outputting the high risk level.

In an optional manner, the risk analyzing portion 403 is further configured to: when the risk level of the code to be detected is the high risk level, store the code to be detected in a high risk code library and mark the code to be detected as non-modifiable, after the operation of analyzing the user trustworthiness score, the time consistency score, the regional score, and the keyword score to obtain the risk level of the code to be detected and outputting the risk level is executed.

Figure 4:
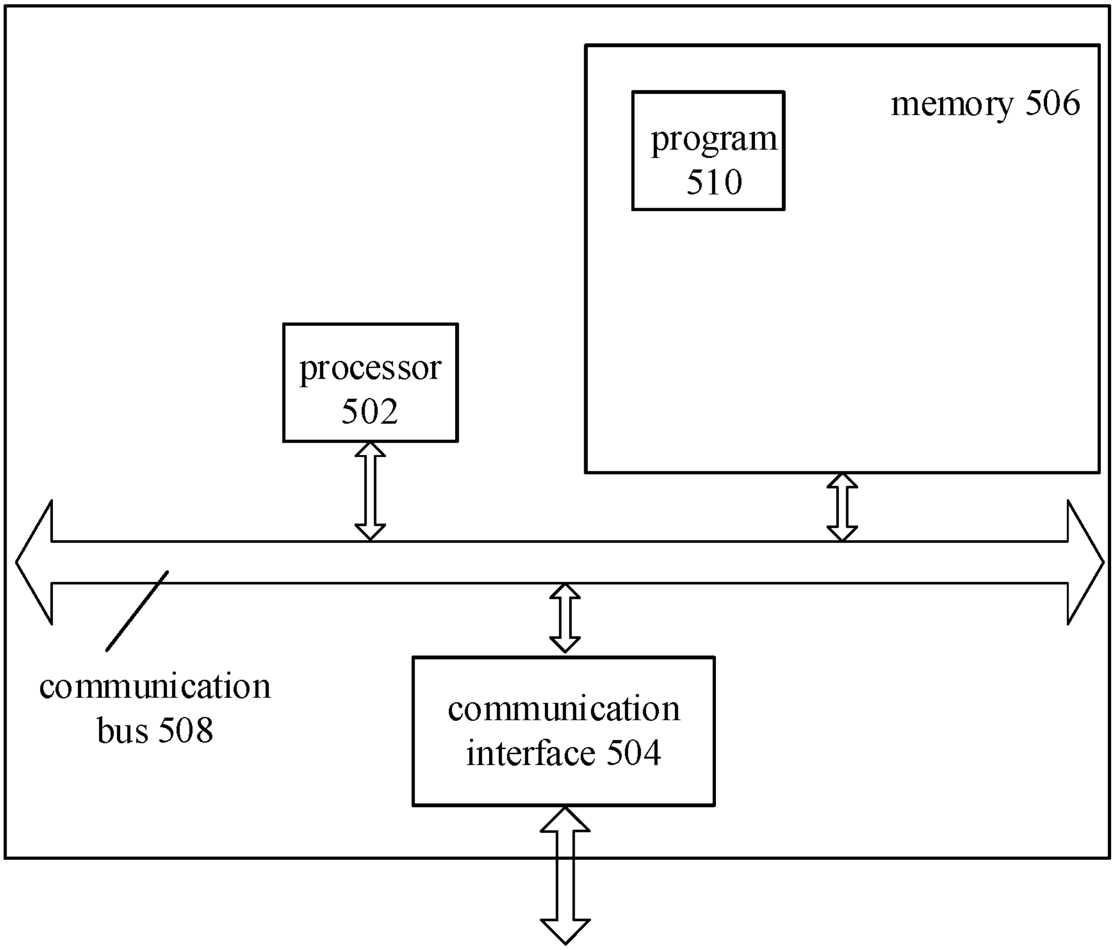
FIG. 4 is a block diagram of a computer device according to an embodiment of the present disclosure.

FIG. 4 shows a block diagram of a computer device of an embodiment in the present disclosure, and specific embodiments of the present disclosure do not limit an implementation of the computer device.

As shown in FIG. 4, the computer device may include a processor 502, a communication interface 504, a memory 506, and a communication bus 508.

The processor 502, the communication interface 504, and the memory 506 communicate with each other through the communication bus 508. The communication interface 504 is configured to communicate with another device, such as a network element of a UE or another server. The processor 502 is configured to execute a program 510, and may perform the related steps in the embodiments of the method for pre-detecting a risk code.

In some embodiments, the program 510 may include a program code that includes computer-executable instructions.

The processor 502 may be a central processing unit (CPU), or an application specific integrated circuit (ASIC), or one or more integrated circuits configured to implement the embodiments of the present disclosure. One or more processors included in the computer device may be processors of the same type, such as one or more CPUs; or may be different types of processors, such as one or more CPUs and one or more ASICs.

The memory 506 is configured to store the program 510. A memory 506 may contain a high speed RAM memory, and may also include a non-volatile memory, for example at least one disk memory.

The program 510 may be invoked by the processor 502 to cause the computer device to perform the following operations:

after receiving a code to be detected input by a target user, obtaining a target historical evaluation record of the target user, a target historical login time and a target historical login address for login to an apparatus for pre-detecting the risky code;

analyzing the target historical evaluation record based on a first preset rule to obtain a target trustworthiness score, analyzing the target historical login time based on a second preset rule to obtain a time consistency score, analyzing the target historical login address based on a third preset rule to obtain a regional score, and analyzing keyword information of the code to be detected based on a fourth preset rule to obtain a keyword score; and analyzing the user trustworthiness score, the time consistency score, the regional score, and the keyword score to obtain a risk level of the code to be detected, and outputting the risk level.

In the embodiment of the present disclosure and other embodiments, the term "portion" may refer to a part of a circuit, a part of a processor, a part of a program or software, etc., and certainly may also be a unit, or a module may also be non-modular.

The embodiments of the present disclosure provide a computer-readable storage medium, which may be a volatile storage medium or a non-volatile storage medium. The storage medium stores at least one executable instruction, and when the executable instruction runs on a computer device/apparatus, the computer device/apparatus executes a method for pre-detecting a risk code in any method embodiment described above.

The executable instructions may be used to cause the computer device/apparatus to perform the following operations:

after receiving a code to be detected input by a target user, obtaining a target historical evaluation record of the target user, a target historical login time and a target historical login address for login to an apparatus for pre-detecting the risky code;

analyzing the target historical evaluation record based on a first preset rule to obtain a target trustworthiness score, analyzing the target historical login time based on a second preset rule to obtain a time consistency score, analyzing the target historical login address based on a third preset rule to obtain a regional score, and analyzing keyword information of the code to be detected based on a fourth preset rule to obtain a keyword score; and analyzing the user trustworthiness score, the time consistency score, the regional score, and the keyword score to obtain a risk level of the code to be detected, and outputting the risk level.

Algorithms or displays provided herein are not inherently related to any particular computer, virtual system, or other device. Various general-purpose systems may also be used with a teaching herein. According to the above description, it would be obvious to construct a structure required by such systems. In addition, the embodiments of the present disclosure are not directed to any specific programming language. It should be understood that various programming languages can be used to implement the content of this disclosure described here, and the description of a specific language above is to disclose the implementation of this disclosure.

In the description provided herein, numerous details are illustrated. It is to be understood, however, that embodiments of the present disclosure may be practiced without these details. In some examples, well-known methods, structures, and techniques are not shown in detail so as not to obscure the understanding of the description.

Similarly, it should be understood that in order to simplify the present disclosure and help understand one or more of various aspects of the present disclosure, in the description of exemplary embodiments of the present disclosure, various features of the embodiments of the present disclosure are sometimes grouped together into a single embodiment, graph, or description thereof. However, the method disclosed should not be interpreted as reflecting an intention that the claimed disclosure requires more features than those expressly recited in each claim. Rather, as reflected by following claims, aspects of invention are less than all features of a single embodiment disclosed previously. Therefore, the claims that follow specific implementation method are explicitly incorporated into the specific implementation method, and each claim itself acts as a separate embodiment of the present disclosure.

Those skilled in the art can understand that portions in a device in the embodiment may be adaptively changed and disposed in one or more devices different from that embodiment. Portions or units or components in an embodiment may be combined into a portion or unit or component, and in addition, they may be divided into a plurality of sub-portions or sub-units or sub-components. In addition to such features and/or processes or at least some of the units are mutually exclusive, any combination may be employed to combine all of the features disclosed in the description (including accompanying claims, abstract, and drawings) and all processes or units of any method or device so disclosed. Each feature disclosed in this description (including the accompanying claims, abstract, and drawings) may be replaced by alternative features that provide same, equivalent, or similar purposes, unless expressly stated otherwise.

Moreover, those skilled in the art can understand that although some embodiments herein include certain features included in other embodiments and rather than other features, combinations of features of different embodiments mean within the scope of the present disclosure and form different embodiments. For example, in the following claims, any one of the claimed embodiments may be used in any combination.

It should be noted that the above embodiments are illustrative of the disclosure rather than limiting the present disclosure, and alternative embodiments may be devised by those skilled in the art without departing from the scope of the appended claims. In the claims, any reference symbols located between parentheses shall not be configured to limit the claims. The word "comprising" does not exclude existence of elements or steps not listed in the claims. The word "a/an" or "one" before the element does not exclude the presence of a plurality of such elements. The present disclosure may be implemented by hardware including several different elements and by suitably programmed computers. In the unit claims enumerating several devices, several of these devices may be embodied by a same hardware item. The use of words first, second, and third and the like does not represent any order. These words may be interpreted as names. The steps in the above embodiments should not be construed as limiting the order of execution except for the special description.

INDUSTRIAL APPLICABILITY

The embodiments of the present disclosure provide a method and an apparatus for pre-detecting a risky code, a device, and a storage medium and a computer program product. The method for pre-detecting the risky code includes: after receiving a code to be detected input by a target user, obtaining a target historical evaluation record of the target user, a target historical login time and a target historical login address for login to an apparatus for pre-detecting the risky code; analyzing the target historical evaluation record based on a first preset rule to obtain a target trustworthiness score, analyzing the target historical login time based on a second preset rule to obtain a time consistency score, analyzing the target historical login address based on a third preset rule to obtain a regional score, analyzing keyword information of the code to be detected based on a fourth preset rule to obtain a keyword score; and analyzing the user trustworthiness score, the time consistency score, the regional score, and the keyword score to obtain a risk level of the code to be detected, and outputting the risk level. The above solution solves the problem that an existing code risk control is not timely, and improves a security of code control.

What is claimed is:

1. A computer-implemented method for pre-detecting a risky code, performed by an apparatus for pre-detecting the risky code in a computer, comprising:

receiving a code to be detected input by a target user, and obtaining a target historical evaluation record of the target user, a target historical login time and target historical login addresses for login to the apparatus for pre-detecting the risky code;

analyzing the target historical evaluation record based on a first preset rule to obtain a target trustworthiness score, analyzing the target historical login time based on a second preset rule to obtain a time consistency score, analyzing the target historical login addresses based on a third preset rule to obtain a regional score, analyzing keyword information of the code to be detected based on a fourth preset rule to obtain a keyword score; and analyzing the target trustworthiness score, the time consistency score, the regional score, and the keyword score to obtain a risk level of the code to be detected, and outputting the risk level;

wherein analyzing the target historical login addresses based on the third preset rule to obtain the regional score comprises:

obtaining a preset number of latest login internet protocol (IP) address records of the target user from the target historical login addresses;

determining a first number of security domain logins in a preset security domain and a second number of non-security domain logins in a preset non-security domain from the preset number of latest login IP address records, wherein a correspondence between first numbers and second preset scores and a correspondence between second numbers and third preset scores are preset;

obtaining the regional score according to a target second preset score corresponding to the first number of security domain logins and a target third preset score corresponding to the second number of non-security domain logins;

wherein the method further comprises:

in response to the risk level of the code to be detected being a high risk level, storing the code to be detected in a high risk code library and marking the code to be detected as non-modifiable, wherein the high risk code library is configured to isolate high-risk level code and to prevent the high risk level code from being executed on the computer and transmitted to other users; and a code to be detected with the high risk level is marked as non-removable within a preset time period.

2. The method of claim 1, wherein analyzing the target historical evaluation record based on the first preset rule to obtain the target trustworthiness score comprises:

obtaining a preset number of latest user trustworthiness evaluation results from the target historical evaluation record, and determining a preset level corresponding to each of the user trustworthiness evaluation results, wherein a correspondence between each preset level and a first preset score is preset, and the user trustworthiness evaluation result is generated according to a risk level of a code which has been uploaded by the target user in the historical evaluation record; and obtaining the target trustworthiness score according to a target first preset score corresponding to each of the user trustworthiness evaluation results.

3. The method of claim 1, wherein analyzing the target historical login time based on the second preset rule to obtain the time consistency score comprises:

obtaining a historical login time distribution of the target user within a preset number of days from the target historical login time;

dividing the historical login time distribution of each day according to a preset time interval, and determining a daily time score according to a division result; and obtaining the time consistency score according to the daily time score.

4. The method of claim 1, wherein analyzing the keyword information of the code to be detected based on the fourth preset rule to obtain the keyword score comprises:

identifying a keyword in the code to be detected by using a preset keyword library;

determining a target attribute label corresponding to the keyword according to a function implemented by the keyword, and obtaining a target fifth preset score corresponding to the target attribute label, wherein a correspondence between attribute labels and fifth preset scores is preset;

determining a target influence range associated with the keyword, and obtaining a target sixth preset score corresponding to the target influence range, wherein a correspondence between influence ranges and sixth preset scores is preset; and obtaining the keyword score according to the target fifth preset score and the target sixth preset score.

5. The method of claim 1, wherein analyzing the target trustworthiness score, the time consistency score, the regional score, and the keyword score to obtain the risk level of the code to be detected and outputting the risk level comprises:

obtaining a first risk feature value according to the target trustworthiness score, the time consistency score, the regional score and the keyword score;

taking a number of code rows of the code to be detected as a second risk feature value, and obtaining a third risk feature value according to the first risk feature value and the second risk feature value;

comparing the first risk feature value with a first preset security range interval, and comparing the second risk feature value with a second preset security range interval;

in response to the first risk feature value being within the first preset security range interval and the second risk feature value being within the second preset security range interval, determining the risk level of the code to be detected as a security level and outputting the security level;

in response to only the first risk feature value being not within the first preset security range interval or only the second risk feature value being not within the second preset security range interval, determining the risk level of the code to be detected as a low risk level and outputting the low risk level; and in response to the first risk feature value being not within the first preset security range interval and the second risk feature value being not within the second preset security range interval, determining the risk level of the code to be detected as the high risk level, and outputting the high risk level.

6. A computer device, comprising: a processor, a memory, a communication interface, and a communication bus, wherein, the processor, the memory, and the communication interface complete mutual communications through the communication bus;

the memory is configured to store at least one executable instruction, and the at least one executable instruction causes the processor to:

receive a code to be detected input by a target user, and obtain a target historical evaluation record of the target user, a target historical login time and target historical login addresses for login to the apparatus for pre-detecting the risky code;

analyze the target historical evaluation record based on a first preset rule to obtain a target trustworthiness score, analyze the target historical login time based on a second preset rule to obtain a time consistency score, analyze the target historical login addresses based on a third preset rule to obtain a regional score, analyze keyword information of the code to be detected based on a fourth preset rule to obtain a keyword score; and analyze the target trustworthiness score, the time consistency score, the regional score, and the keyword score to obtain a risk level of the code to be detected, and output the risk level;

wherein the at least one executable instruction causes the processor to analyze the target historical login addresses based on the third preset rule to obtain the regional score by:

obtaining a preset number of latest login internet protocol (IP) address records of the target user from the target historical login addresses;

determining a first number of security domain logins in a preset security domain and a second number of non-security domain logins in a preset non-security domain from the preset number of latest login IP address records, wherein a correspondence between first numbers and second preset scores and a correspondence between second numbers and third preset scores are preset;

obtaining the regional score according to a target second preset score corresponding to the first number of security domain logins and a target third preset score corresponding to the second number of non-security domain logins;

wherein the method further comprises:

in response to the risk level of the code to be detected being a high risk level, storing the code to be detected in a high risk code library and marking the code to be detected as non-modifiable, wherein the high risk code library is configured to isolate high risk level code and to prevent the high risk level code from being executed on the computer and transmitted to other users; and a code to be detected with the high risk level is marked as non-removable within a preset time period.

7. A non-transitory computer readable storage medium, wherein at least one executable instruction is stored in the computer readable storage medium, and when the at least one executable instruction runs on a computer device/apparatus, the computer device/apparatus is caused to:

receive a code to be detected input by a target user, and obtain a target historical evaluation record of the target user, a target historical login time and target historical login addresses for login to the apparatus for pre-detecting the risky code;

analyze the target historical evaluation record based on a first preset rule to obtain a target trustworthiness score, analyze the target historical login time based on a second preset rule to obtain a time consistency score, analyze the target historical login addresses based on a third preset rule to obtain a regional score, analyze keyword information of the code to be detected based on a fourth preset rule to obtain a keyword score; and analyze the target trustworthiness score, the time consistency score, the regional score, and the keyword score to obtain a risk level of the code to be detected, and output the risk level;

wherein the at least one executable instruction causes the computer device/apparatus to analyze the target historical login addresses based on the third preset rule to obtain the regional score by:

obtaining a preset number of latest login internet protocol (IP) address records of the target user from the target historical login addresses;

determining a first number of security domain logins in a preset security domain and a second number of non-security domain logins in a preset non-security domain from the preset number of latest login IP address records, wherein a correspondence between first numbers and second preset scores and a correspondence between second numbers and third preset scores are preset;

obtaining the regional score according to a target second preset score corresponding to the first number of security domain logins and a target third preset score corresponding to the second number of non-security domain logins;

wherein the computer device/apparatus is further caused to:

in response to the risk level of the code to be detected being a high risk level, store the code to be detected in a high risk code library and marking the code to be detected as non-modifiable, wherein the high risk code library is configured to isolate high-risk level code and to prevent the high-risk level code from being executed on the computer and transmitted to other users; and a code to be detected with the high risk level is marked as non-removable within a preset time period.

8. The computer device of claim 6, wherein the at least one executable instruction causes the processor to analyze the target historical evaluation record based on the first preset rule to obtain the target trustworthiness score by:

obtaining a preset number of latest user trustworthiness evaluation results from the target historical evaluation record, and determining a preset level corresponding to each of the user trustworthiness evaluation results, wherein a correspondence between each preset level and a first preset score is preset, and the user trustworthiness evaluation result is generated according to a risk level of a code which has been uploaded by the target user in the historical evaluation record; and obtaining the target trustworthiness score according to a target first preset score corresponding to each of the user trustworthiness evaluation results.

9. The computer device of claim 6, wherein the at least one executable instruction causes the processor to analyze the target historical login time based on the second preset rule to obtain the time consistency score by:

obtaining a historical login time distribution of the target user within a preset number of days from the target historical login time;

dividing the historical login time distribution of each day according to a preset time interval, and determining a daily time score according to a division result; and obtaining the time consistency score according to the daily time score.

10. The computer device of claim 6, wherein the at least one executable instruction causes the processor to analyze the keyword information of the code to be detected based on the fourth preset rule to obtain the keyword score by:

identifying a keyword in the code to be detected by using a preset keyword library;

determining a target attribute label corresponding to the keyword according to a function implemented by the keyword, and obtaining a target fifth preset score corresponding to the target attribute label, wherein a correspondence between attribute labels and fifth preset scores is preset;

determining a target influence range associated with the keyword, and obtaining a target sixth preset score corresponding to the target influence range, wherein a correspondence between influence ranges and sixth preset scores is preset; and obtaining the keyword score according to the target fifth preset score and the target sixth preset score.

11. The computer device of claim 6, wherein the at least one executable instruction causes the processor to analyze the target trustworthiness score, the time consistency score, the regional score, and the keyword score to obtain the risk level of the code to be detected and outputting the risk level by:

obtaining a first risk feature value according to the target trustworthiness score, the time consistency score, the regional score and the keyword score;

taking a number of code rows of the code to be detected as a second risk feature value, and obtaining a third risk feature value according to the first risk feature value and the second risk feature value;

comparing the first risk feature value with a first preset security range interval, and comparing the second risk feature value with a second preset security range interval;

in response to the first risk feature value being within the first preset security range interval and the second risk feature value being within the second preset security range interval, determining the risk level of the code to be detected as a security level and outputting the security level;

in response to only the first risk feature value being not within the first preset security range interval or only the second risk feature value being not within the second preset security range interval, determining the risk level of the code to be detected as a low risk level and outputting the low risk level; and in response to the first risk feature value being not within the first preset security range interval and the second risk feature value being not within the second preset security range interval, determining the risk level of the code to be detected as the high risk level, and outputting the high risk level.

12. The non-transitory computer readable storage medium of claim 7, wherein the computer device/apparatus is further caused to:

obtain a preset number of latest user trustworthiness evaluation results from the target historical evaluation record, and determine a preset level corresponding to each of the user trustworthiness evaluation results, wherein a correspondence between each preset level and a first preset score is preset, and the user trustworthiness evaluation result is generated according to a risk level of a code which has been uploaded by the target user in the historical evaluation record; and obtain the target trustworthiness score according to a target first preset score corresponding to each of the user trustworthiness evaluation results.

13. The non-transitory computer readable storage medium of claim 7, wherein the computer device/apparatus is caused to:

obtain a historical login time distribution of the target user within a preset number of days from the target historical login time;

divide the historical login time distribution of each day according to a preset time interval, and determine a daily time score according to a division result; and obtain the time consistency score according to the daily time score.

14. The non-transitory computer readable storage medium of claim 7, wherein the computer device/apparatus is caused to:

identify a keyword in the code to be detected by using a preset keyword library;

determine a target attribute label corresponding to the keyword according to a function implemented by the keyword, and obtain a target fifth preset score corresponding to the target attribute label, wherein a correspondence between attribute labels and fifth preset scores is preset;

determine a target influence range associated with the keyword, and obtain a target sixth preset score corresponding to the target influence range, wherein a correspondence between influence ranges and sixth preset scores is preset; and obtain the keyword score according to the target fifth preset score and the target sixth preset score.

15. The non-transitory computer readable storage medium of claim 7, wherein the computer device/apparatus is caused to:

obtain a first risk feature value according to the target trustworthiness score, the time consistency score, the regional score and the keyword score;

take a number of code rows of the code to be detected as a second risk feature value, and obtain a third risk feature value according to the first risk feature value and the second risk feature value;

compare the first risk feature value with a first preset security range interval, and compare the second risk feature value with a second preset security range interval;

in response to the first risk feature value being within the first preset security range interval and the second risk feature value being within the second preset security range interval, determine the risk level of the code to be detected as a security level and output the security level;

in response to only the first risk feature value being not within the first preset security range interval or only the second risk feature value being not within the second preset security range interval, determine the risk level of the code to be detected as a low risk level and output the low risk level; and in response to the first risk feature value being not within the first preset security range interval and the second risk feature value being not within the second preset security range interval, determine the risk level of the code to be detected as the high risk level, and output the high risk level.

* * * * *